(12) United States Patent
Ferguson et al.

(10) Patent No.: US 10,142,199 B2
(45) Date of Patent: Nov. 27, 2018

(54) AUTOMATIC PROCESS DATA TRANSMISSION AND MONITORING FOR AN INDUSTRIAL PROCESS NETWORK

(71) Applicant: Emerson Process Management LLLP, Eden Prairie, MN (US)

(72) Inventors: Anthony Dean Ferguson, Minnetrista, MN (US); Brian Alan Franchuk, Richfield, MN (US); Thomas Marvin Bell, Lakeville, MN (US)

(73) Assignee: Emerson Process Management LLLP, Shakopee, MN (US)

( * ) Notice: Subject to any disclaimer, the term of this patent is extended or adjusted under 35 U.S.C. 154(b) by 817 days.

(21) Appl. No.: 14/576,764

(22) Filed: Dec. 19, 2014

(65) Prior Publication Data

US 2016/0182323 A1   Jun. 23, 2016

(51) Int. Cl.
*H04L 12/26* (2006.01)
*H04L 12/24* (2006.01)
*H04L 12/40* (2006.01)

(52) U.S. Cl.
CPC ............ *H04L 43/062* (2013.01); *H04L 41/24* (2013.01); *H04L 43/18* (2013.01); *H04L 2012/4026* (2013.01)

(58) Field of Classification Search
CPC ..... H04L 43/062; H04L 43/045; H04L 43/18; H04L 41/24; H04L 2012/42026
See application file for complete search history.

(56) References Cited

U.S. PATENT DOCUMENTS

| | | | | |
|---|---|---|---|---|
| 5,903,455 A | * | 5/1999 | Sharpe, Jr. | ......... G05B 19/0423 700/17 |
| 5,978,850 A | * | 11/1999 | Ramachandran | ..... G06F 9/4411 709/223 |
| 6,397,322 B1 | * | 5/2002 | Voss | ....................... H02H 9/008 340/532 |
| 7,013,184 B2 | | 3/2006 | Romagnoli et al. | |
| 7,984,199 B2 | | 7/2011 | Ferguson et al. | |
| 2005/0007249 A1 | | 1/2005 | Eryurek et al. | |
| 2007/0142934 A1 | | 6/2007 | Boercsoek et al. | |

(Continued)

FOREIGN PATENT DOCUMENTS

EP          2296069 A1     3/2011

OTHER PUBLICATIONS

International Search Report and Written Opinion from PCT Application Serial No. PCT/US2015/058762, dated Apr. 22, 2016, 15 pages.

(Continued)

*Primary Examiner* — Larry Donaghue
(74) *Attorney, Agent, or Firm* — Kinney & Lange, P.A.

(57) ABSTRACT

A field device can transmit, over an industrial process network, data (e.g., including process data) to a host device configured to send and receive messages with one or more field devices. The field device can transmit the data in response to receiving a communications token that delegates time to the field device to transmit data over the industrial process network. A data monitoring device can monitor the data transmitted over the industrial process network, and can output at least a portion of the data for display at a display device operatively coupled to the data monitoring device.

8 Claims, 4 Drawing Sheets

(56) References Cited

U.S. PATENT DOCUMENTS

| | | | |
|---|---|---|---|
| 2007/0233283 A1* | 10/2007 | Chen | G05B 19/4185 |
| | | | 700/17 |
| 2011/0238372 A1 | 9/2011 | Akimoto et al. | |
| 2013/0304240 A1 | 11/2013 | Szurek et al. | |
| 2014/0269764 A1 | 9/2014 | Borgeson et al. | |
| 2015/0088281 A1* | 3/2015 | Downor | G05B 19/0425 |
| | | | 700/80 |
| 2015/0120972 A1* | 4/2015 | Tanimura | G06F 13/409 |
| | | | 710/106 |

OTHER PUBLICATIONS

International Preliminary Report on Patentability for PCT Application No. PCT/US2015/058762, dated Jun. 20, 2017, 12 pages.
Partial Supplementary European Search Report for European Patent Application No. 15870537.6, dated Apr. 20, 2018, 12 pages.
Patzke R Ed—Mishra Alok et al.: "Fieldbus basics", Computer Standards and Interfaces, Elesevier Sequoia. Lausanne, CH, vol. 19, No. 5-6, Oct. 15, 1998, pp. 275-293.
Extended European Search Report for European Patent Application No. 15870537.6, 11 pages, dated Aug. 2, 2018.

\* cited by examiner

AUTOMATIC PROCESS DATA TRANSMISSION AND MONITORING FOR AN INDUSTRIAL PROCESS NETWORK

BACKGROUND

The present disclosure relates generally to data transfer on an industrial process network. More particularly, the present disclosure relates to automatic transmission and monitoring of data on the industrial process network.

In a typical industrial plant, a distributed control system (DCS) is used to control many of the industrial processes performed at the plant. Typically, the plant has a centralized control room having a computer system with user input/output (I/O), disc I/O, and other peripherals. Coupled to the computer system are a controller and a process I/O subsystem. The process I/O subsystem includes I/O ports, which are connected to various field devices throughout the plant. Field devices include various types of analytical equipment, such as pressure sensors, temperature sensors, switches, transducers, valve positioners and actuators, as well as any other device that performs a function in a distributed control system.

Traditionally, analog field devices have been connected to the control room by two-wire twisted pair current loops, with each device connected to the control room by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 milliamps running through the loop. An analog field device that transmits a signal to the control room modulates the current running through the current loop, with the current proportional to a sensed process variable. On the other hand, an analog field device that performs an action under control of the control room is controlled by the magnitude of the current through the loops, which is modulated by the I/O port of the process I/O system, which in turn is controlled by the controller.

Historically, most traditional field devices have had either a single input or a single output that was directly related to the primary function performed by the field device. For example, often the only function implemented by a traditional analog resistive temperature sensor is to transmit a temperature by modulating the current flowing through the two-wire twisted pair, while the only function implemented by a traditional analog valve positioner is to position a valve between an open and closed position based on the magnitude of the current flowing through the two-wire twisted pair.

More recently, hybrid systems that superimpose digital data on the current loop have been used in process control systems. One hybrid system is known in the control art as the Highway Addressable Remote Transducer (HART) and is similar to the Bell 202 modem specification. The HART system uses the magnitude of the current in the current loop to sense a process variable (as in the traditional system), but also superimposes a digital carrier signal upon the current loop signal. The carrier signal is relatively slow, and can provide updates of a secondary process variable at a rate of approximately 2-3 updates per second. Generally, the digital carrier signal is used to send secondary and diagnostic information and is not used to realize the primary control function of the field device. Examples of information provided over the carrier signal include secondary process variables, diagnostic information (including sensor diagnostics, device diagnostics, wiring diagnostics, and process diagnostics), operating temperatures, temperature of the sensor, calibration information, device identification information, materials of construction, configuration or programming information, or other types of information. Accordingly, a single hybrid field device may have a variety of input and output variables and may implement a variety of functions.

Foundation Fieldbus is a multi-drop serial digital two-way communications protocol defined by the Instrument Society of America (ISA), and is intended for connecting field instruments and other process devices (e.g., monitoring and simulation units) in distributed control systems. Foundation Fieldbus allows enhanced digital communication over previous process control loop methods while maintaining the ability to power process devices coupled to the Fieldbus loop and while meeting intrinsic safety requirements. For instance, the Foundation Fieldbus specification (i.e., including the physical layer specification and the data link layer specification) defines networks that transmit data at much higher data rates than traditional hybrid systems, such as at data rates up to 31.25 kilobits per second (Kbps) for an H1 Fieldbus network and data rates up to 2.5 megabits per second (Mbps) for an H2 Fieldbus network.

The Fieldbus Message Specification (FMS) defines a messaging protocol for communications over the Fieldbus network, accomplished via Virtual Communication Relationships (VCRs). The VCRs provide connection-based channels for the transfer of data between applications and/or devices. Devices on the Fieldbus network communicate via both scheduled and unscheduled communications managed by a Link Master (LM) device that is designated as the Link Active Scheduler (LAS). During scheduled communications, often reserved for the transmission of process data (e.g., data sensed by and/or used by a field device for operation of the industrial process), the LAS device issues a compel data message to a field device. In response to receiving the compel data message, the field device publishes its process data over the network to one or more subscriber devices. Unscheduled communications are accomplished via a token passing algorithm managed by the LAS device. The LAS device issues a pass token message in turn to each device included in a list of active devices on the network, often referred to as the live list. Upon receiving the pass token message, a field device transmits any unscheduled data until all of its data has been published or a configurable "maximum token hold time" has expired.

Due to the connection-based nature of the VCRs and the command-response protocol by which a field device transmits process data (e.g., in response to a received compel data message), initial communications with a field device to retrieve process data can often require a potentially costly host device that has been configured to communicate with the field device by a controls engineer or other technical expert. For instance, initial communications to retrieve process data from a field device can often involve a host device adding the field device to the live list of devices, establishing a VCR with the field device to open communications, retrieving a list of function blocks from the field device that are used to determine the process data, opening an identified function block associated with a particular process variable, and reading the process variable from the function block. Such operations can be time-consuming and costly to implement, thereby increasing costs associated with configuration and commissioning of field devices within a Fieldbus network and generally decreasing usability of the system as a whole. Moreover, because field devices are typically configured to transmit process data in response to a received compel data message, it can be difficult to monitor process data transmitted by multiple field devices on the network without a LAS (e.g., a host device) configured to schedule and transmit the compel data messages in a deterministic manner.

SUMMARY

In one example, a method of monitoring data on an industrial process network includes transmitting, by a field device over the industrial process network, data to a host device configured to send and receive messages with one or more field devices. The method further includes monitoring, by a data monitoring device, the data transmitted over the industrial process network, and outputting, by the data monitoring device, at least a portion of the data for display at a display device operatively coupled to the data monitoring device.

In another example, a method of transmitting data on an industrial process network includes sensing, by a field device, one or more process parameters of an industrial process, and determining, by the field device based at least in part on the sensed one or more process parameters, control data for use in real-time control of the industrial process. The method further includes receiving, by the field device from a host device, a communications token that delegates time to the field device to transmit data over the industrial process network, and transmitting, by the field device to the host device in response to receiving the communications token, the control data for use in the real-time control of the industrial process.

In another example, a method of transmitting data on an industrial process network includes transmitting, by a host device to a field device, a communications token that delegates time to the field device to transmit data over the industrial process network. The method further includes receiving, by the host device from the field device, control data for use in real-time control of an industrial process without transmitting a compel data message configured to request the field device to transmit the control data.

In another example, a data monitoring device for an industrial process network includes at least one processor, one or more storage devices, and a receiver configured to receive data via the industrial process network. The one or more storage devices are encoded with instructions that, when executed by the at least one processor, cause the data monitoring device to monitor data transmitted over the industrial process network by a field device to a host device, and output at least a portion of the data for display at a display device operatively coupled to the data monitoring device.

In another example, a field device includes at least one processor, one or more storage devices, one or more sensors, and a transceiver configured to send and receive data over an industrial process network. The one or more storage devices are encoded with instructions that, when executed by the at least one processor, cause the field device to sense, via the one or more sensors, one or more process parameters of an industrial process, and determine, based at least in part on the sensed one or more process parameters, control data for use in real-time control of the industrial process. The one or more storage devices are further encoded with instructions that, when executed by the at least one processor, cause the field device to receive, from a host device via the transceiver, a communications token that delegates time to the field device to transmit data over the industrial process network, and transmit, to the host device via the transceiver and in response to receiving the communications token, the control data for use in the real-time control of the industrial process.

DETAILED DESCRIPTION

According to techniques described herein, a field device can automatically transmit process data for use in real-time control and/or monitoring of an industrial process. Rather than transmit the process data in response to receiving a compel data message that requests the process data, a field device implementing techniques of this disclosure can automatically transmit the process data in response to receiving a communications token that delegates time to the field device for communications on the network. In this way, a field device can automatically publish its real-time process data, thereby facilitating out-of-the-box communications with the field device without requiring a potentially costly host device configured to communicate with the field device. Moreover, by transmitting the process-related data in response to receiving the communications token, a field device implementing techniques described herein can help to decrease overhead on the network in the form of compel data messages and corresponding responses, thereby increasing network utilization. As such, techniques of this disclosure can increase the ease and efficiency by which an industrial process network can be configured while decreasing the cost associated with such configuration. In some examples, a data monitoring device can monitor and display one or more portions of the data transmitted over the network. That is, rather than require configuration and/or modification of a host device to display the data, a data monitoring device can "listen" to traffic on the network, thereby enabling a technician, process engineer, or other such user to visualize data transmitted over the network without requiring additional modifications to and/or processing burdens on the system's host device. Accordingly, techniques of this disclosure can enable quick and efficient out-of-the-box communications with a field device, such as for configuration and/or commissioning of the device.

Figure 1:
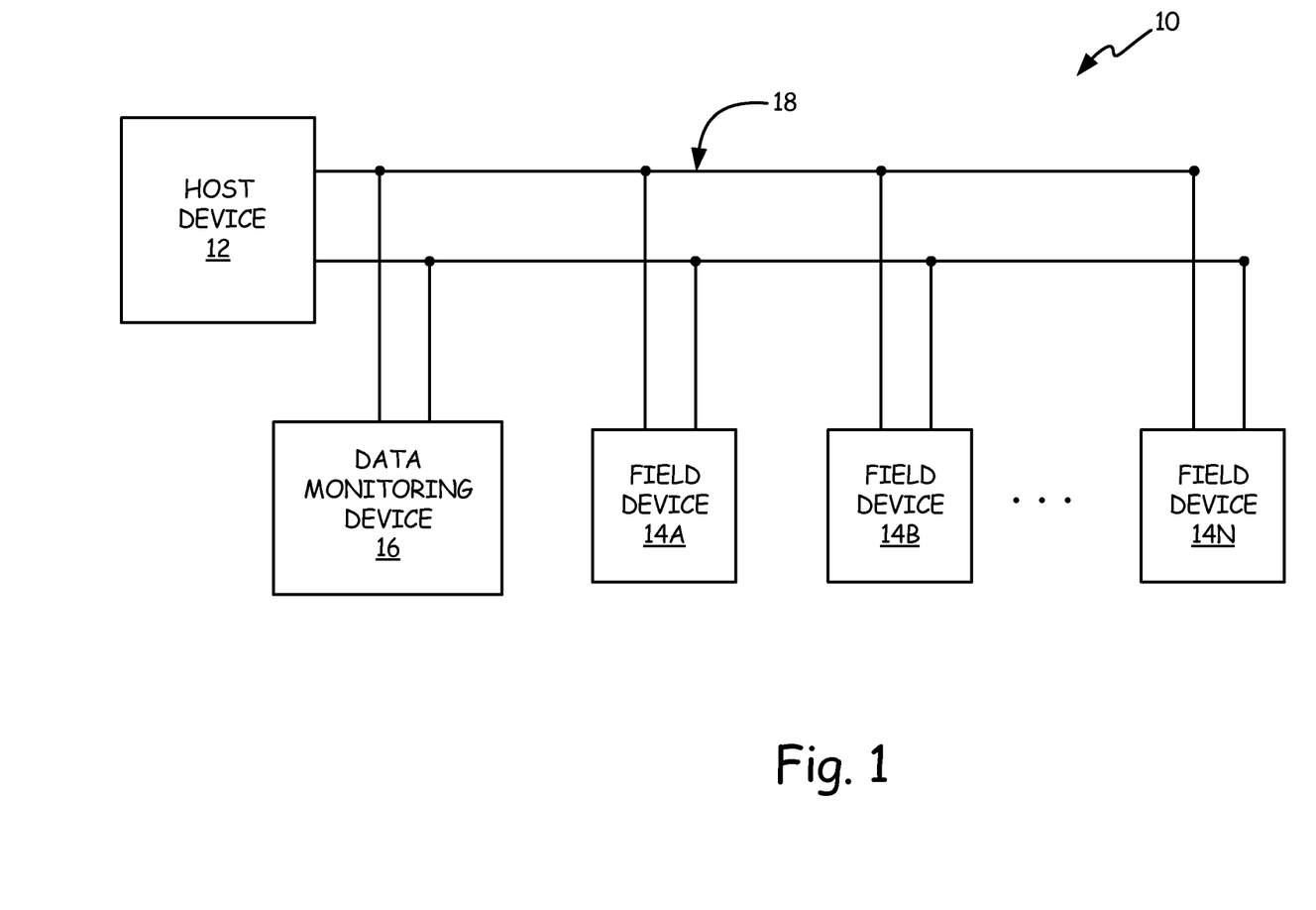
FIG. 1 is a block diagram illustrating an industrial process network including a data monitoring device that can monitor process data automatically transmitted by field devices over the network.

FIG. 1 is a block diagram illustrating one embodiment of industrial process network 10 including host device 12, field devices 14A-14N (collectively referred to herein as "field devices 14") and data monitoring device 16. Although network 10 will be described in the context of a process control/monitoring system using Foundation Fieldbus communication protocol with communication of messages over bus 18, techniques of this disclosure may have general applicability to digital networks having host and/or field devices that engage in message transactions.

Host device 12 may typically be located within a centralized control room in an industrial process plant. In other examples, host device 12 can be a handheld device that can be attached and detached from bus 18 at various locations. Bus 18 can be, for example, a two-wire twisted pair or a four-wire cable that provides a communication pathway over which messages can be sent. Bus 18 can support a plurality of devices on a single cable, although the number of devices on bus 18 may be based at least in part on a target loop execution speed and/or intrinsic safety requirements. Accordingly, field devices 14 are illustrated and described with respect to the example of FIG. 1 as including "N" field devices, where "N" represents an arbitrary number.

Host device 12 may typically act as a link active scheduler (LAS) of network 10. In its function as the LAS device, host device 12 maintains a central schedule for all communications between devices on bus 18. At least one of the other devices in network 10 (e.g., one or more of field devices 14) can be configured to act as a link master (LM) device. An LM device can be configured to take over scheduling responsibilities of the LAS device should the LAS device fail or become inoperable. In some examples, more than one LM device can be present on bus 18, thereby providing further backup for scheduling responsibilities.

Field devices 14, in some examples, can be process instruments that sense one or more process parameters and provide data based upon the sensed parameters. In certain examples, field devices 14 can be process actuators that provide a physical output based upon a command message received, e.g., over bus 18. In some examples, one or more of field devices 14 can be process instruments and one or more of field devices 14 can be process actuators. In certain examples, one or more of field devices 14 can include both sensing and actuating capabilities. Examples of field devices 14 include, but are not limited to, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, and indicator lights.

As one example operation, host device 12 can act as a LAS device for network 10, thereby maintaining a central schedule for communications between any one or more of host device 12 and field devices 14 over bus 18. Host device 12 can initiate scheduled communications with field devices 14, such as by transmitting compel data messages to field devices 14, in turn, over bus 18 according to the central schedule. In response to receiving a compel data message, the respective one of field devices 14 can transmit its scheduled communications data over bus 18. Scheduled communications data can include, for example, process variable data sensed by the respective field device and used for control of the industrial process. As another example, scheduled communications data can include actuator state information (e.g., position information) of the respective one of field devices 14. In general, scheduled communications data can typically include data identified as critical to real-time operation and control of the industrial process network, such as data used by function blocks executing on field devices 14 to monitor and/or control operation of the industrial process.

As one example, host device 12 can transmit a compel data message to field device 14A at a time identified by the central schedule for scheduled communications with field device 14A. In response to receiving the compel data message, field device 14A can transmit its scheduled communications data over bus 18, such as process parameter data sensed by field device 14A (e.g., temperature data, pressure data, or other types of process parameter data). The transmitted data can be received by one or more of host device 12 and field devices 14B-14N (i.e., others of field devices 14) that are configured to receive data transmissions from field device 14A, often referred to as "subscriber" devices. Host device 12 can transmit compel data messages to each of field devices 14 that are included in a live list of devices (i.e., a list of field devices 14 configured to transmit data over bus 18) according to the schedule, thereby managing scheduled communications over bus 18 in a deterministic manner.

Host device 12 can further initiate unscheduled communications with field devices 14 via a token passing algorithm. According to the token passing algorithm, host device 12 can transmit a "pass token" message to each of field devices 14, in turn, to initiate unscheduled data transmissions from the respective field device. Unscheduled data transmissions can include, for instance, configuration data, alarm data, event data, trend data, diagnostic data, status data, data for operator displays, or other types of data. In general, unscheduled data can include any data not identified as critical to real-time operation of the industrial process network, such as data that is not used by function blocks executing on field devices 14 to monitor and/or control operation of the industrial process.

As an example, host device 12 can transmit a pass token message over bus 18 to field device 14A. Field device 14A, in response to receiving the pass token message, can transmit any unscheduled data identified (e.g., queued) by field device 14A for transmission over bus 18. Field device 14A can transmit the unscheduled data until all of the unscheduled data identified for transmission has been transmitted over bus 18, or until a configurable "maximum token hold time" has elapsed. The maximum token hold time parameter can effectively define an unscheduled data transmission time window within which field devices 14 can transmit unscheduled data. In some examples, each of field devices 14 can be configured with a same maximum token hold time, thereby defining a same length of time for unscheduled data transmissions for each of field devices 14. In other examples, one or more of field devices 14 be configured with different maximum token hold times.

In examples where the maximum token hold time elapses prior to a complete transmission of the unscheduled data, field device 14A can store (e.g., queue) the unsent data for later transmission, such as during the next unscheduled data transmission window. In examples where field device 14A transmits all of its unscheduled data prior to expiration of the maximum token hold time, field device 14A can transmit a token return message to host device 12 to indicate that it has completed its unscheduled data transmission. Host device 12 can transmit a pass token message to each of field devices 14, respectively, which can each transmit unscheduled data over bus 18 as described with respect to field device 14A. In this way, host device 12 can manage unscheduled data communications of field devices 14.

Scheduled and/or unscheduled communications over bus 18 can be accomplished via VCRs between any one or more of host device 12 and field devices 14. The VCRs provide connection-based channels for the transfer of data between devices on bus 18. Any one or more of host device 12 and field devices 14 can exchange data using the VCRs via messages having a format defined by the Fieldbus Message Specification (FMS). FMS messages transmitted via the connection-based VCRs include a message payload as well as overhead in the form of a message preamble, a start delimiter, a stop delimiter, and other meta data associated with the message. FMS messages transmitted via the connection-based VCRs are acknowledged with a corresponding acknowledgement message from the receiving device, thereby indicating that the message was received. Unacknowledged messages can be retransmitted, thereby increasing robustness of system communications.

According to techniques of this disclosure, any one or more of field devices 14 can operate in accordance with an automatic data publishing operational mode to automatically transfer data, such as process data used for real-time control and/or monitoring of an industrial process, in response to receiving a pass token message. That is, rather than operate in accordance with a compel data operational mode in which the field device refrains from transmitting process data until the field device receives a compel data message to request the process data, any one or more of field devices 14 can transmit process data in response to receiving the pass token message. In this way, as is further described below, field devices 14 can automatically publish process data without requiring an LAS device (e.g., host device 12) configured to manage scheduled communications, thereby facilitating out-of-the-box communications with the field device. Accordingly, communications with any one or more of field devices 14 can be accomplished without requiring a multi-step configuration of the field device, thereby decreasing the time and associated costs associated with configuration, commissioning, testing, or maintenance of the field device. Moreover, by transmitting the process data in response to the communications token (rather than a separate compel data message that requires a corresponding response), the field device can increase network utilization (i.e., a utilized amount of network bandwidth).

In some examples, one or more of field devices 14 can transition between a compel data operational mode and an automatic data publishing operational mode. For instance, field device 14A (or any of field devices 14) can transition from a compel data operational mode in which field device 14A refrains from transmitting process data until field device 14A receives a compel data message to an automatic data publishing operational mode in response to determining that field device 14A has not received a compel data message within a threshold amount of time (e.g., thirty seconds, one minute, two minutes, or other threshold amounts of time). As such, a field device operating in according with techniques of this disclosure can help to ensure backwards compatibility with host devices and/or industrial process networks that are not configured to operate in accordance with the automatic data publishing operational mode.

As illustrated in FIG. 1, industrial process network 10 can include data monitoring device 16 configured to receive and/or send data via bus 18. In some examples, data monitoring device 16 can be substantially similar to host device 12, as is further described below. In general, data monitoring device 16 can be any device having hardware and/or software components configured to enable data monitoring device 16 to send and/or receive data via bus 18. Data monitoring device 16, in some examples, can include a display device, such as within a housing of the data monitoring device 16. Examples of such a display device can include a light emitting diode (LED) display, a cathode ray tube (CRT) monitor, a liquid crystal display (LCDs), or other type of device for outputting visual information. In certain examples, the display device can be remote from (e.g., not integrally formed with) data monitoring device 16, but rather can be operatively coupled to data monitoring device 16 (e.g., electrically coupled, communicatively coupled, or otherwise operatively coupled).

As described herein, data monitoring device 16 can monitor (e.g., receive) data transmitted over bus 18, such as data transmitted from any one or more of field devices 14 (e.g., auto-published data) and/or data transmitted between host device 12 and field devices 14 (e.g., compelled data). As such, data monitoring device 16 can be considered, in certain examples, a passive monitoring device that is not included in the live list of devices, but rather "listens" to network traffic over bus 18 to enable passive monitoring of the data. As one example operation, data monitoring device 16 can be a handheld or other device registered as a subscriber device of data transmitted from any one or more of field devices 14 and host device 12, thereby enabling data monitoring device 16 to receive messages transmitted over bus 18 from each of the devices to which data monitoring device 16 subscribes.

Example network traffic that can be received by data monitoring device 16 can include process data transmitted by field devices 14 via an automatic data publishing operational mode and/or process data transmitted by one or more of field devices 14 via a compel data operational mode. In some examples, the received data can include view data corresponding to the process data and descriptive of one or more attributes of the process data. For instance, the view data can be descriptive of a data type attribute of the process data (e.g., pressure, temperature, flow rate, or other data types), a data range attribute of the process data (e.g., a valid data range, a configured data range, or other data range information), or other such data attributes. In certain examples, the received data can include typically unscheduled data (e.g., data transmitted during unscheduled communications when the field device operates in a compel data operational mode), such as configuration data, alarm data, event data, trend data, diagnostic data, status data, data for operator displays, or other types of data. In general, data monitoring device 16 can receive any type of data transmitted over bus 18, thereby enabling data monitoring device 16 to monitor the entirety of the network traffic.

Data monitoring device 16 can output at least a portion of the received data for display at a display device. For instance, data monitoring device 16 can output device process data (e.g., temperature data, pressure data, flow rate data, actuator position data, or other types of process data), process data status information, process data range information, process data units information, or other types of data. In certain examples, data monitoring device 16 can output trending information corresponding to the data, such as trends of the process variable value over time. In some examples, data monitoring device 16 can implement and display the received data in accordance with a supervisory control and data acquisition (SCADA) system.

Data received by data monitoring device 16 can, in some examples, include alert data, such as data transmitted by one or more of field devices 14 indicating and/or identifying aspects of an alert state of the originating device (e.g., overpressure states, operational error codes, or other alert states). In certain examples, data monitoring device 16 can transmit an acknowledgment to an originating one of field devices 14 (i.e., the one of field devices 14 that transmitted the alert data) to acknowledge and/or clear the alert state of the device. As such, data monitoring device 16 can, in some examples, actively transmit data over bus 18.

Accordingly, as described herein, any one or more of field devices 14 can automatically transmit process data for use in real-time control and/or monitoring of an industrial process, thereby facilitating initial communications with the field device to decrease a time and cost associated with activities such as device configuration, commissioning, testing, and maintenance. Data monitoring device 16 can monitor data transmitted over bus 18 and can output at least a portion of the data for display. In this way, data monitoring device 16 can enable a technician, process engineer, or other such user to visualize data transmitted over the network without requiring additional modifications to and/or processing burdens on host device 12.

Figure 2:
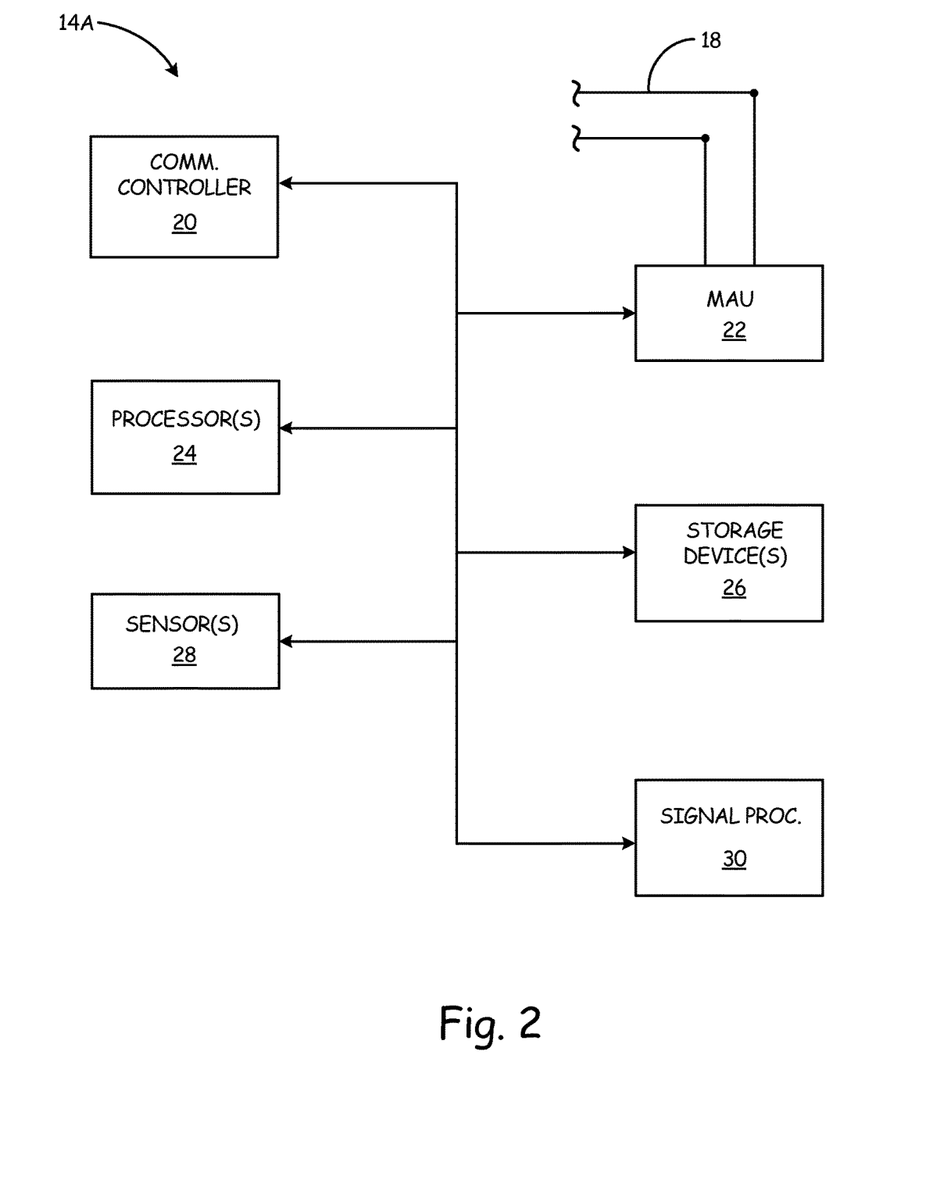
FIG. 2 is a block diagram of a field device.

FIG. 2 is a block diagram of one embodiment of field device 14A of FIG. 1. However, while illustrated and described with respect to field device 14A, it should be understood that field devices 14 of FIG. 1 can be substantially similar, such that field device 14A of FIG. 2 can be any of field devices 14.

As illustrated in FIG. 2, field device 14A can include communications controller 20, medium attachment unit (MAU) 22, processor(s) 24, storage device(s) 26, sensor(s) 28, and signal processing circuitry 30. Sensor 30 can sense one or more process parameters or variables and provide corresponding sensor signals to signal processing circuitry 30. The sensor signals can include a primary variable (e.g., pressure) and a secondary variable (e.g., temperature). The secondary variable can be used by processor 24, in some examples, for correction or compensation of the sensor signal representing the primary variable.

Signal processing circuitry 30 typically includes analog-to-digital conversion circuitry, as well as filtering and other signal processing to place the sensor signals into a format that can be used by processor 24. For example, signal processing circuitry 30 can include any one or more sigma delta analog-to-digital converters and digital filters to provide digitized and filtered sensor signals to processor 24.

Processor 24, in one example, is configured to implement functionality and/or process instructions for execution within field device 14A, such as to coordinate the operation of field device 14A. For example, processor 24 can process instructions stored in storage device 26 to process data received over bus 18, receive and store sensor signals generated by sensor 28 (e.g., within storage device 26), and create and select data to be contained in messages that are transmitted from field device 14A over bus 18. Examples of processor 24 can include any one or more of a microprocessor, a controller, a digital signal processor (DSP), an application specific integrated circuit (ASIC), a field-programmable gate array (FPGA), or other equivalent discrete or integrated logic circuitry.

Storage device 26 can be configured to store information within field device 14A during operation. Storage device 26, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device 26 is not long-term storage. Storage device 26, in some examples, is described as a volatile memory, meaning that storage device 26 does not maintain stored contents when power to field device 14A is turned off. Examples of volatile memories can include random access memories (RAM), dynamic random access memories (DRAM), static random access memories (SRAM), and other forms of volatile memories. In some examples, storage device 26 is used to store program instructions for execution by processor 24. For instance, storage device 26 can store instructions for operating in an automatic data publishing operational mode to automatically transmit process data in accordance with techniques described herein. Storage device 26, in one example, is used by software, firmware, or other application logic executing on processor 24 to temporarily store information during program execution.

Storage device 26, in some examples, also includes one or more computer-readable storage media. Storage device 26 can be configured to store larger amounts of information than volatile memory. Storage device 26 can further be configured for long-term storage of information. In some examples, storage device 26 includes non-volatile storage elements. Examples of such non-volatile storage elements can include magnetic hard discs, optical discs, floppy discs, flash memories, or forms of electrically programmable memories (EPROM) or electrically erasable and programmable memories (EEPROM).

Communications controller 20 can serve as an interface between processor 24 and MAU 22. For example, communications controller 20, which can be an ASIC, can receive data from MAU 22, decode the data, form the data into bytes, and provide message data to be read by processor 24. As another example, communications controller 20 can receive bytes of data from processor 24, format the data into messages, and provide messages to MAU 22 for transmission on bus 18. MAU 22 can provide network connection of field device 14A to bus 18. MAU 22 can be an integrated circuit or discrete components.

Figure 3:
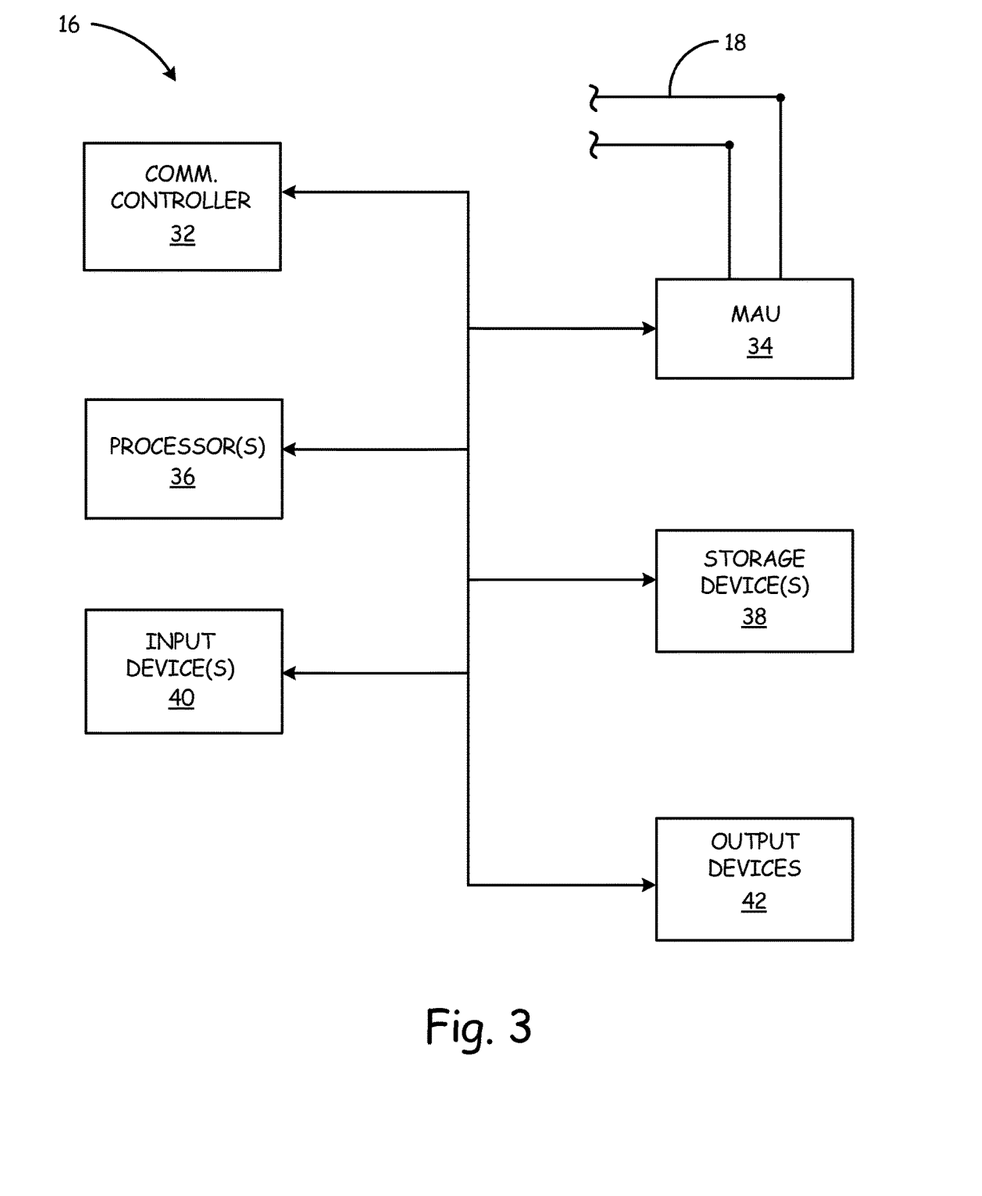
FIG. 3 is a block diagram of a data monitoring device.

FIG. 3 is a block diagram of one embodiment of data monitoring device 16 of FIG. 1. As illustrated, the overall architecture of data monitoring device 16 can be similar to that of field devices 14, and includes communications controller 32, MAU 34, processor(s) 36, storage device(s) 38, input device(s) 40, and output device(s) 42. In addition, while FIG. 3 is described with respect to data monitoring device 16, in some examples, host device 12 can be substantially similar to data monitoring device 16. For instance, host device 12 can include hardware and software components to enable host device 12 to send and receive messages over bus 18 and to operate in accordance with functional aspects attributed herein to host device 12.

Each of communications controller 32, MAU 34, processor 36, and storage device 38 can be substantially similar to communications controller 20, MAU 22, processor 24, and storage device 26 of field device 14A, respectively. For example, communications controller 32 can serve as an interface between processor 36 and MAU 34 for sending and receiving message data over bus 18. In addition, storage device 38 can be described as a computer-readable storage medium encoded with instructions which, when executed by processor 36, cause data monitoring device 16 to operate in accordance with techniques described herein.

As illustrated in FIG. 3, data monitoring device 16 can further include input device(s) 40 and output device(s) 42. Input device 40, in some examples, is configured to receive input from a user. Examples of input device 40 can include any one or more of a mouse, a keyboard, a microphone, a presence-sensitive and/or touch-sensitive display, or other type of device configured to receive input from a user. Output device 42 can be configured to provide output to a user. Examples of output device 42 can include a sound card, a video graphics card, a speaker, a light emitting diode (LED), a display device such as a cathode ray tube (CRT) monitor or liquid crystal display (LCD), or other type of device for outputting information in a form understandable to users or machines.

In some examples, storage device 38 can be encoded with instructions which, when executed by processor 36, cause processor 36 to execute a user interface (UI) application configured to allow user interaction with one or more devices connected to network 10. For example, data monitoring device 16 can execute a UI application that accepts input via input device 40, such as input to identify one or more of field devices 14 and data to be monitored from and/or to the identified one or more of field devices 14. For instance, host device 12 can execute a UI application that interprets process data received from one or more of field devices 14 based on view data associated with the process data (e.g., data type, data units, or other view data). The UI application can output the interpreted process data for display at a display device, such as at output device 42.

Figure 4:
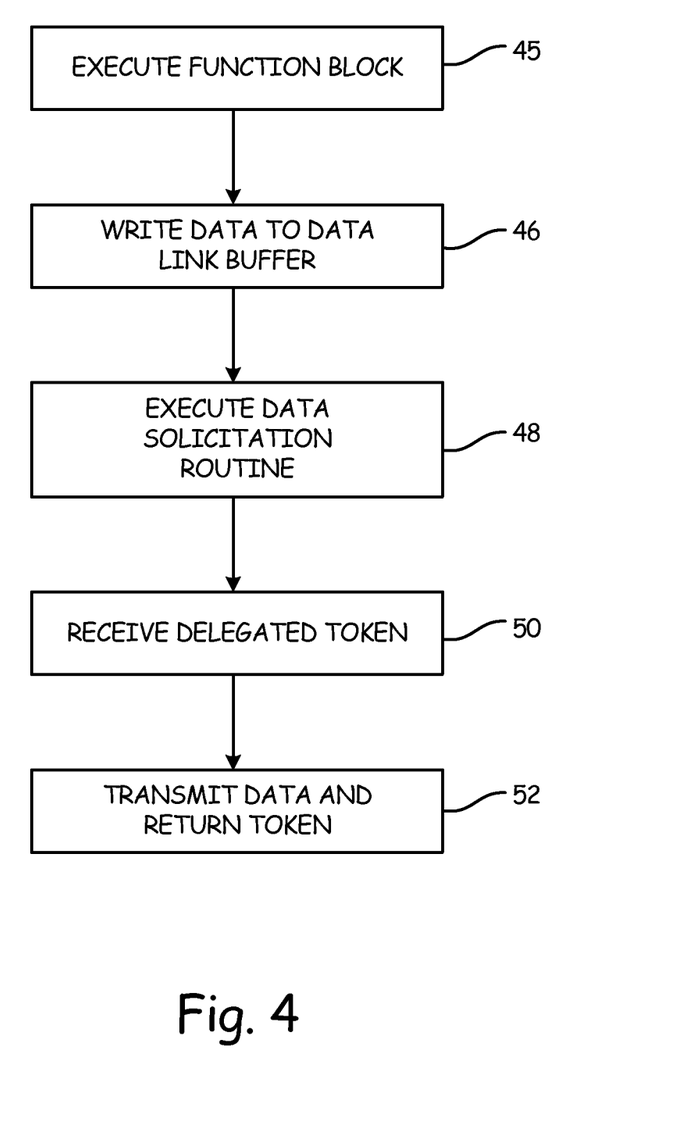
FIG. 4 is a sequence diagram illustrating example operations for automatically transmitting process data from a field device over an industrial process network.

FIG. 4 is a sequence diagram illustrating example operations for automatically transmitting process data from a field device over an industrial process network. While the example operations are described with respect to automatically transmitting process data from field device 14A to host device 12, the example operations can be applicable to data transmitted from any one or more of field devices 14 to any other device connected to network 10, such as to data monitoring device 16.

Field device 14A can execute a function block to determine process data based on one or more sensed parameters (step 45). For example, processor 24 of field device 14A can execute a function block to determine process data, such as pressure data, temperature data, flow rate data, or other types of process data, based on parameters sensed by sensor 28. Field device 14A can write the process data to a data link buffer (step 46), such as a data link buffer stored in computer-readable memory (e.g., storage device 26). The data link buffer can be, in some examples, a queue or other data structure configured to store data received over bus 18 (e.g., from host device 12) and/or data identified for later transmission over bus 18 (e.g., process data, unscheduled data such as event data and alarm data, or other types of data).

Subsequent to writing the process data to the data link buffer, field device 14A can execute a data solicitation routine configured to cause field device 14A to transmit the process data over bus 18 in response to receiving a delegated token (step 48). In some examples, field device 14A can execute the data solicitation routine in response to determining that field device 14A is operating in an automatic data publish operational mode. For instance, field device 14A can execute the data solicitation routine while operating in the automatic data publish operational mode (e.g., to cause field device 14A to automatically publish its process data at the delegated time for unscheduled communications), but can refrain from executing the data solicitation routine while operating in a compel data operational mode. In this way, field device 14A can refrain from automatically publishing process data while operating in the compel data operational mode to facilitate compatibility of field device 14A with networks and/or host devices that may not be configured to receive the automatically published data.

Host device 12 can transmit a delegated token (e.g., a pass token message) to field device 14A (step 50). As described above, host device 12 (or another device configured as the LAS device) can execute a token passing algorithm to pass token messages, in turn, to each device included in the live list of devices, thereby delegating time for data transmission to each of the devices. Each device included in the live list can transmit data (e.g., unscheduled data) in response to receiving the delegated token. As illustrated in FIG. 4, field device 14A can transmit data included in the data link buffer identified for transmission in response to receiving the delegated token (step 52). The transmitted data can include process data, view data corresponding to the data, event data, alarm data, device state data, or other types of data, and can be transmitted via one or more individual messages. In some examples, such as the example of FIG. 4, field device 14A can transmit a return token appended to the buffered data (e.g., appended to a last message of the buffered data). In other examples, field device 14A can transmit the return token as a separate message subsequent to transmitting the buffered data. The return token can indicate (e.g., to host device 12) that field device 14A has completed its transmission of data. Thereafter, host device 12 (or the active LAS device) can delegate the token to another device on the network, such as to another of field devices 14 (e.g., field device 14B). In this way, host device 12 can manage data transmissions over bus 18 to enable each of the devices on the live list to transmit data in a deterministic manner.

Accordingly, a field device implementing techniques of this disclosure can automatically transmit process data in response to receiving a delegated token. Rather than require a host device to issue a compel data message to retrieve a particular process variable, the field device can automatically publish its process data and, in some examples, view data descriptive of the process data. In this way, techniques of this disclosure can facilitate initial communications with the field device without requiring a multi-step initialization process and potentially costly and time-consuming configuration of the host device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of monitoring data on an industrial process network, the method comprising:

transmitting, by a field device over the industrial process network, data to a host device configured to send and receive messages with one or more field devices, wherein the data transmitted over the industrial process network by the field device comprises:

process data identified for use in real-time control of an industrial process;

view data corresponding to the process data, the view data descriptive of one or more attributes of the process data; and an alert generated by the field device, the alert corresponding to an operational state of the field device;

monitoring, by a data monitoring device, the data transmitted over the industrial process network, the monitoring comprising receiving the data from the field device;

interpreting, by the data monitoring device, one or more attributes of the process data based on the view data;

outputting, by the data monitoring device, at least a portion of the data for display at a display device operatively coupled to the data monitoring device, wherein outputting at least the portion of the data for display at the display device comprises outputting the interpreted process data and the alert for display at the display device; and transmitting, by the data monitoring device, a response message to the alert, the response message configured to acknowledge the alert transmitted by the field device.

2. The method of claim 1, wherein the view data is descriptive of at least one of a data type attribute of the process data and a data range attribute of the process data.

3. The method of claim 1, wherein the view data comprises configuration data corresponding to the field device, the configuration data descriptive of one or more functional attributes of the field device.

4. The method of claim 1, wherein outputting at least the portion of the data for display at the display device comprises outputting at least the portion of the data for display in a supervisory control and data acquisition (SCADA) display format.

5. The method of claim 1, wherein outputting at least the portion of the data for display at the display device comprises outputting trending data that indicates a change of the process data over time.

6. The method of claim 1, wherein the field device comprises a first field device, and wherein the data comprises first data, the method further comprising:

transmitting, by a second field device over the industrial process network, second data to the host device;

monitoring, by the data monitoring device, the second data transmitted over the industrial process network; and outputting, by the data monitoring device, at least a portion of the second data for display at the display device.

7. The method of claim 1, wherein the data monitoring device comprises the display device.

8. The method of claim 1, wherein the data monitoring device comprises an intrinsically safe device.

* * * * *